(12) United States Patent
Faulkner

(10) Patent No.: US 6,737,479 B2
(45) Date of Patent: May 18, 2004

(54) DYNAMICALLY CURED FLUOROELASTOMER BLENDS

(75) Inventor: Roger Faulkner, Whitman, MA (US)

(73) Assignee: Immix Technologies, LLC, Hanover, MA (US)

( * ) Notice: Subject to any disclaimer, the term of this patent is extended or adjusted under 35 U.S.C. 154(b) by 0 days.

(21) Appl. No.: 09/991,075

(22) Filed: Nov. 16, 2001

(65) Prior Publication Data

US 2002/0099142 A1 Jul. 25, 2002

Related U.S. Application Data

(60) Provisional application No. 60/249,715, filed on Nov. 17, 2000.

(51) Int. Cl.$^7$ .............................. C08F 8/00; C08L 27/12
(52) U.S. Cl. ........................ 525/192; 525/194; 525/199
(58) Field of Search ................................. 525/192, 194, 525/199

(56) References Cited

U.S. PATENT DOCUMENTS 4,115,481 A * 9/1978 Finlay et al. ................ 525/199
6,087,406 A * 7/2000 Worm et al. ................ 521/41.5

* cited by examiner

Primary Examiner—Nathan M. Nutter
(74) Attorney, Agent, or Firm—Brian M. Dingman, Esq.; Mirick, O'Connell, DeMaillie & Lougee, LLP

(57) ABSTRACT

A millable, vulcanizable elastomeric composition comprising two fluoroelastomer phases, phase 1 and phase 2, wherein fluoroelastomer phase 1 is present as crosslinked fluoroelastomer particles, and where fluoroelastomer phase 2 remains flowable until a final stage vulcanization occurs, and where fluoroelastomer phase 1 is present at between 5–85% by weight of the final composition.

18 Claims, No Drawings

DYNAMICALLY CURED FLUOROELASTOMER BLENDS

This application claims the benefit of Provisional Application No. 60/249,715 filed Nov. 17, 2000.

BACKGROUND OF THE INVENTION

Dynamic vulcanizates are known in the prior art, both in rubber/plastic blends, and in rubber/rubber dynamic vulcanizates. For example, U.S. Pat. No. 5,053,450 teaches dynamic vulcanization of acrylate copolymer elastomers in a matrix of fluoroelastomer, but no prior art patent suggests that one grade of fluoroelastomer might usefully be dynamically vulcanized while being blended with a second type of fluoroelastomer.

A key raw material used in some of the dynamic vulcanizates of this invention are the iodine-terminated peroxide-curable FKMs of U.S. Pat. No. 4,158,678. These polymers have iodine groups only on the chain termini (i.e., they are "telechelic" polymers). The reactivity of the iodine terminal groups is very high, so that substantially all of them can be incorporated into crosslinks. These polymers have the property that, provided there is enough peroxide and coagent to cause the reaction of all the iodine-functional endgroups into the elastomer network, adding more peroxide and coagent has little additional effect.

SUMMARY OF THE INVENTION

It has been found that elastomeric polymer blends that include:
1. a first portion of one or more fluoroelastomers, known collectively as fluoroelastomer phase 1, which is readily crosslinkable by a cure system 1 that does not crosslink fluoroelastomer phase 2 (or which crosslinks as fluoroelastomer phase 2 at a much slower rate than fluoroelastomer phase 1), and
2. a second portion of one or more fluoroelastomers, known collectively as fluoroelastomer phase 2, which is capable of being crosslinked by a different cure system 2 than is used to crosslink fluoroelastomer phase 1, can be dynamically cured during intensive mixing using cure system 1 under conditions where fluoroelastomer phase 1 is crosslinked but not fluoroelastomer phase 2. These dynamic vulcanizates can subsequently be mixed (at low temperature) with cure system 2 to produce a fluoroelastomer compound with one or more of these special properties:

- high green strength due to the high gel content, which leads to good shape retention of extrusions and low extrusion die swell;
- low tendency to blister, to the extent that some versions can be cured at atmospheric pressure without blistering;
- low cost compared to similar compounds based on only one type of fluoroelastomer (in some commercially significant cases);
- relatively high tear strength compared to a standard (non-dynamically cured) fluoroelastomers using the same filler system.

The invention includes polymer blends containing at least two and possibly three or more non-miscible fluoroelastomers, at least one of which is dynamically vulcanized. All the fluoroelastomers that cure during dynamic vulcanization of a blend of the present invention are said to constitute "fluoroelastomer phase 1". Fluoroelastomer phase 1 can contain several different types of crosslinked fluoroelastomers. All the fluoroelastomers that do not cure during dynamic vulcanization of a blend of the present invention are said to constitute "fluoroelastomer phase 2". Fluoroelastomer phase 2 can also contain several different types of flowable, non-crosslinked fluoroelastomers. These fluoroelastomer phases can in general consist of any workable blend of elastomers that have more than 17% by weight elemental fluorine, including all the known commercial classes of fluoroelastomer. This includes specifically blends of:

- elastomeric copolymers of vinylidene fluoride and hexafluoropropene ("FKM dipolymers" herein);
- elastomeric copolymers that are derived from at least three monomers, including vinylidene fluoride and hexafluoropropene which also contain polymerized residues from other monomers, such special cure site monomers, tetrafluoroethylene, ethylene and/or perfluorovinylethers. ("FKM copolymers" herein);
- elastomeric "peroxide-curable FKM" refers to FKM copolymers that are derived from at least three monomers: vinylidene fluoride, hexafluoropropene, and one or more special reactive cure site monomers that confer peroxide-reactivity to the polymer. Peroxide-curable FKMs can also contain tetrafluoroethylene, ethylene, and/or perfluorovinylethers.
- elastomeric copolymers of propene and tetrafluoroethylene ("FEPM copolymers" herein);
- perfluoroelastomers ("FFKM copolymers" herein) of the polymethylene type having all fluoro, perfluoroalkyl, or perfluoroalkoxy substituent groups on the polymer chain; a small fraction of these groups may contain functionality to facilitate vulcanization;
- elastomeric perfluoropolyethers, such as poly(perfluoropropyleneoxide) and copolymers thereof containing cure sites;
- fluorosilicones, which consist of polydialkylsiloxanes in which at least 28% of the siloxane residues have at least one 3,3,3-trifluoropropyl residue attached to the silicon atom.

As will become be clear in the detailed discussion below, only certain particular mixtures of fluoroelastomers actually work to form the blends of this invention by dynamic vulcanization.

The presence of microscopic crosslinked fluoroelastomer particles ("fluoroelastomer phase 1") in the presence of one or more flowable fluoroelastomers ("fluoroelastomer phase 2") confers several useful properties, including greater resistance to blistering in low temperature curing, improved green strength, reduced extrusion die swell, improved tear strength, and/or improved economics. Improved economics comes about primarily because the method makes it possible to blend relatively inexpensive fluoroelastomers, such as for example copolymers of vinylidene fluoride and hexafluoropropene ("FKM dipolymers") with more expensive peroxide-curable copolymers, fluorosilicone polymers, or perfluoroelastomers. The requirement for the process to work is that independent (or nearly so) cure systems must exist for fluoroelastomer phase 1 and fluoroelastomer phase 2, and also fluoroelastomer phase 1 must not be miscible with fluoroelastomer phase 2.

Definitions of Terms

For purposes of this disclosure, "fluoroelastomer" means elastomeric copolymers containing 17% or more elemental fluorine. Fluoroelastomers include FKM, perfluoroelastomers, and fluorosilicone polymers.

For purposes of this disclosure, "FKM" without modifiers means elastomeric copolymers that are derived from at least two monomers, vinylidene fluoride and hexafluoropropene. FKM may also contain polymerized residues from other monomers, such as tetrafluoroethylene, ethylene, special cure site monomers, and/or perfluorovinylethers.

For purposes of this disclosure, "FKM dipolymer" means copolymers that are derived from only two monomers, vinylidene fluoride and hexafluoropropene, with vinylidene fluoride content from 40–70% by weight.

For purposes of this disclosure, "FKM copolymer" means elastomeric copolymers that are derived from at least three monomers, including vinylidene fluoride and hexafluoropropene which also contain polymerized residues from other monomers, such as tetrafluoroethylene, ethylene, and/or perfluorovinylethers. FKM dipolymers and copolymers are not readily crosslinkable by peroxides and/or peroxides+ coagents.

For purposes of this disclosure, "peroxide-curable FKM" refers to FKM copolymers that are derived from at least three monomers: vinylidene fluoride, hexafluoropropene, and one or more special reactive cure site monomers that confer peroxide-reactivity to the polymer. Peroxide-curable FKMs can also contain tetrafluoroethylene, ethylene, and/or perfluorovinylethers. Peroxide-curable FKMs can be crosslinked by peroxide or another source of reactive free radicals, and preferably also a reactive coagent such as triallylisocyanurate (TAIC) or various other multifunctional vinyl group-containing coagents.

For purposes of this disclosure, perfluoroelastomers (also "FFKM" copolymers" herein) are polymers of the polymethylene type having all fluoro, perfluoroalkyl, or perfluoroalkoxy substituent groups on the polymer chain; a small fraction of these groups may contain functionality to facilitate vulcanization.

For purposes of this disclosure, "perfluoropolyethers" refer to elastomeric fluoropolyethers which contain ether linkages in the main chain, such as poly (perfluoropropyleneoxide) and copolymers thereof with other cyclic oxiranes which may or may not contain fluorine and/or cure sites.

For purposes of this disclosure, alternating copolymers of propylene with tetrafluoroethylene are herein known as "FEPM;" a small fraction of special cure site monomers may also be copolymerized in FEPM or generated therein by reactive polymer processing to facilitate vulcanization. FEPM is normally cured with peroxide plus a reactive coagent.

DETAILED DESCRIPTION AND PREFERRED EMBODIMENTS OF THE INVENTION

Fluoroelastomers are generally used in applications requiring superior resistance to hydrocarbons (both lubricating oils and fuels), elevated temperatures, or both. Because of the low solubility of both organic vapors and water in FKM, FEPM, and FFKM, these particular fluoroelastomers in general have a high tendency to blister during curing, and therefore usually must be cured under pressure. Bisphenol- and diamine-cured FKMs evolve water vapor during curing. Peroxide-cured FKMs and FEPMs release low molecular weight organic byproducts of peroxide decomposition during curing. FFKMs may also release various volatile byproducts of curing, depending on what cure site monomers are employed therein.

Of the available prior art FKMs, the particular peroxide-crosslinkable FKMs with iodine containing cure site monomers can be formulated to have a low tendency to blister, primarily because they cure efficiently with very low amounts of peroxide (below 0.5% by weight). Examples of such materials include Ausimont's Technoflon P-710 and all of Daikin's peroxide-curable FKMs.

It has been found that some peroxide-vulcanizable FKM polymers are surprisingly much less reactive with diamine crosslinkers (such as Diak #1, hexamethylenediamine carbamate) or bisphenol cure systems compared to many non-peroxide-crosslinkable grades of FKM. The surprisingly low reactivity of certain iodine-functional peroxide-curable FKMs towards the diamine- or bisphenol-based cure system used to dynamically vulcanize fluoroelastomer phase 1 make these especially desirable as fluoroelastomer phase 2 polymers. The difference in reactivity is great enough to selectively vulcanize a general-purpose FKM (fluoroelastomer phase 1) with diamine or bisphenol while mixing with a peroxide-vulcanizable FKM grade or grades (fluoroelastomer phase 2). All such combinations that work to produce processable dynamic vulcanizates are part of the present invention. The particularly preferred combinations are those of readily diamine- or bisphenol-vulcanizable FKM elastomers as fluoroelastomer phase 1, with an iodine-functional peroxide-curable FKM as fluoroelastomer phase 2.

Table 1 gives several examples of the present invention. These particular compounds are all examples of diamine-, or bisphenol-cured FKM dipolymer or copolymer as fluoroelastomer phase 1, cured in the presence of one or more FKM copolymers which are crosslinkable by peroxide or another source of reactive free radicals (fluoroelastomer phase 2). The distinguishing feature of combinations of materials that work is that the elastomers that comprise fluoroelastomer phase 1 must be more reactive with the selected diamine-, polyamine-, bisphenol-, or polyphenol-based cure system than the elastomers that comprise fluoroelastomer phase 2. The invention is not limited to these particular dynamically vulcanized fluoroelastomer blends, but also applies to various combinations of fluoroelastomers (as described below) that are expected to work in the process of this invention to produce useful elastomeric materials.

A particularly promising set of applications for the products of this invention are extrusions (for example hoses, wire and cable insulation, and wiper blades) which are cured at elevated temperature and atmospheric pressure (or nearly so). Three particular examples of such low pressure, high temperature curing processes are hot air vulcanization (HAV), curing in molten salt baths, and microwave curing lines.

In such low pressure, high temperature curing processes, the extruded FKM profile must be processable without scorching at typical rubber extrusion conditions (~120° C.), following which the extrudate is heated to a higher cure temperature downstream of the extruder. Whether the extrudate is heated by conduction, convection, or radiation, conventional FKM thermoset compounds of the prior art are prone to blistering when cured at ambient pressure, whereas certain dynamically vulcanized blends of the present invention are unusually resistant to blistering.

Another promising application for the compounds of this invention is for low-temperature FKMs. In this application, a high-cost, low-temperature FKM (such as Viton GLT, Technoflon P-710, or Dai-E1 LT-302) is used as the non-curing matrix phase polymer in a dynamically vulcanized blend with ordinary FKM. The effectiveness of a minor portion of a high-cost, low-$T_g$FKM in such a blend with micron-sized crosslinked particles of ordinary FKM is enhanced because the low-$T_g$ FKM is present as the continuous or "matrix" phase. ($T_g$ refers to the glass transition temperature, which is closely related to the temperature at which an elastomer becomes brittle.)

Another promising application for the compounds of this invention is to FKM compounds requiring improved tear strength, especially hot tear strength. It is surprising that some particular versions of the present invention have improved tear strength over similar prior art non-dynamically cured compounds that have the same volume fractions of polymers and fillers.

It is also feasible to create dynamic vulcanizates in which the peroxide-crosslinkable FKM is "fluoroelastomer phase 1," and is dynamically vulcanized in a matrix of a bisphenol- or diamine-cured FKM as "fluoroelastomer phase 2." However, such blends are much more expensive given the higher cost of peroxide-curable FKM, and furthermore these blends are prone to blistering. Although in most cases this reverse-mode dynamic vulcanization is less desirable, there may be certain particular instances where this reversal of curing versus non-curing FKM phases may be desirable.

Another promising application for the compounds of this invention is to create blends that are not feasible by ordinary blending methods. FEPM for example can be dynamically crosslinked in a matrix of a bisphenol-curable FKM copolymer, such as Dyneon's Base Resistant Elastomer (BRE).

Another particularly promising application of the invention is to dynamically vulcanize fluorosilicone in a matrix of FKM. One version of this is to dynamically vulcanize fluorosilicone with peroxide in a matrix of diamine- or bisphenol-curable FKM. A particularly desirable way to dynamically vulcanize fluorosilicone in a matrix of FKM is to use platinum/hydride-vulcanized fluorosilicone as fluoroelastomer phase 1, dynamically cured in a matrix of a peroxide-curable FKM. In this case, the cure sites present on the fluorosilicone are vinyl-functional and are reactive with SiH groups in an added hydride-functional silicone fluid (which can be a standard silicone or a fluorosilicone) when catalyzed with platinum or another suitable catalyst. (The reactive groups on peroxide curable FKM do not form crosslinks with hydride-functional fluids.)

Another particularly promising application of the invention is to dynamically vulcanize diamine- or bisphenol-cured FKM in a matrix of fluorosilicone. The fluorosilicone can be peroxide-cured or it can be cured by a hydride ($R_3Si$—H) functional oligomer that forms crosslinks via addition reactions with vinyl groups on the fluorosilicone. Hydride addition reactions are necessarily catalyzed, normally by platinum or rhodium, but other catalysts may also be used in principle. It is critical in this case that the FKM cure system not cause degradation of the fluorosilicone nor deactivation of the hydride addition catalyst. Some types of FKM cure systems involving strong base or phosphonium accelerators may not be workable in conjunction with the catalyzed hydride cure system for fluorosilicones, but in these cases, it is still possible to crosslink the fluorosilicone with peroxides. As in any peroxide cure, reactive coagents may also be employed.

Another application of the invention is to dynamically vulcanize a diamine- or bisphenol-cured FKM in a matrix of FEPM.

Another application of the invention is to dynamically vulcanize FKM in a matrix of FFKM. There are several different known cure mechanisms for FFKM (perfluoroelastomer). In some instances, FFKM may be non-reactive towards peroxides, in which case the peroxide-curable FKM in such a blend can be dynamically vulcanized by peroxides in the presence of the FFKM. On the other hand, FFKM that is cured by a cycloaddition reaction of acetylene groups, is also reactive with free radicals from peroxide, and so this type of FFKM will preferably be dynamically cured with bisphenol-cured FKM.

EXAMPLES OF THE INVENTION

Table 1 gives nine examples of dynamically vulcanized FKM compounds of the present invention, and three examples of comparable FKM compounds that are not dynamically vulcanized. All the particular dynamically cured examples in Table 1 were based on an FKM dipolymer or non-peroxide-crosslinkable FKM copolymer (fluoroelastomer phase 1) dynamically vulcanized in a peroxide-curable FKM (fluoroelastomer phase 2). All dynamic vulcanization recipes were sized to fill 65% by volume of the Brabender Prep Center mix chamber, using Banbury blades.

In all but one of the listed examples, the cure system for the FKM dipolymer is a magnesium oxide-activated diamine curative (hexamethylenediamine carbamate, or Diak #1). This does not in any way imply that Diak #1 is the only curative that will work to dynamically vulcanize FKM in a matrix of peroxide-curable FKM. Indeed, bisphenol-based dynamic vulcanizations of dipolymer FKM in peroxide-curable FKM have been successfully performed, such as DV9 of Table 1.

A preliminary experiment was done to assess the reactivity of various peroxide-curable FKMs with Diak #1. A series of different peroxide-curable FKMs was placed in a hot (150° C.) Brabender Plasticorder mix chamber with 0.35% by weight of added Diak #1. The mix torque increase and the discoloration (of the originally pale polymers) as a result of the Diak #1 addition was evaluated. Among all the peroxide-curable FKMs that were evaluated, the lowest degree of reactivity was observed for Daikin's low temperature peroxide-curable FKM, Dai-E1 LT-302. Therefore, this particular polymer was used as fluoroelastomer phase 2 in the first dynamic vulcanization experiments that were attempted (Examples DV1 through DV4 in Table 1).

Example DV1 of Table 1 was prepared in a Brabender Prep Center mixer with Banbury mix blades. Two different methods of preparing DV1 were tried with similar but not identical results. All dynamic vulcanization recipes were sized to fill 65% by volume of the Brabender Prep Center mix chamber, using Banbury blades. In one method, all the ingredients of the recipe were mixed together in a Brabender Prep Center mixer with Banbury mix blades. The initial body temperature of the prep center mixer was 90° C., and all the ingredients of the recipe were mixed together except for the Diak #1 at low speed (25 RPMs). Once all the filler was apparently well-mixed (this takes 3–4 minutes), the Diak #1 was added (at ~120° C.), and the mix speed was increased to 80 RPMs. About a minute after the addition of the Diak #1, the torque begins to increase as the dynamic vulcanization begins. Temperature increases rapidly after the mix speed is increased to 80 RPMs, especially after the torque increase due to curing begins. As is typically observed in dynamic vulcanization, the torque increases and then decreases as the dynamic vulcanization proceeds. The dynamically vulcanizing blend was mixed for a total of 5 minutes after the addition of the Diak #1, at which time the temperature was 193° C. This method resulted in a dynamic vulcanizate with undispersed white particles that appeared to be MgO. It was not possible to disperse these particles by milling.

In the second method of mixing DV1, all ingredients except for the Diak #1 were first mixed into a "masterbatch" in a conventional, first stage mix step in the BR Banbury (dump temperature=138° C.). After Banbury mixing, this masterbatch was further mill blended to fully disperse the fillers. After mill blending, no undispersed fillers were observed. (The Lycal 9312 MgO was particularly difficult to disperse.) Then, the proper amount of pre-mixed masterbatch was added to the Brabender mixer, using the same temperature and RPM settings described in the previous paragraph. Diak #1 was added as before, and the dynamic vulcanization conditions were the same. This time, the resultant dynamic vulcanizate did not contain any obvious poorly dispersed particulates. This is the method that was also used for Examples DV2–DV4, though with the modification that the carbon black was mixed into the masterbatch just before addition of the Diak #1 in examples DV2–DV4.

Examples DV2–DV4 are designed to study the suitability of different carbon blacks in dynamic vulcanization. It has been observed in various prior art dynamic vulcanizations that very high surface area fillers can interfere with the critical phase inversion step of the dynamic vulcanization. DV2 through DV4 add 5 phr of 3 different carbon blacks of increasing surface area to the previously successful dynamic vulcanization to test whether this behavior is observed. All dynamic vulcanization recipes were sized to fill 65% by volume of the Brabender Prep Center mix chamber, using Banbury blades. In each case, it was attempted to carry out the dynamic vulcanization with the ram up, as was successfully done in preparing DV1 by both methods described above. This worked well for both DV2 and DV3, indicating that N990 and N550 carbon blacks did not interfere with the phase inversion process. DV4 on the other hand started to be forced out of the Brabender Prep Center mixer during dynamic vulcanization, so the ram had to be held down during the dynamic vulcanization process. Based on this, N326 and finer grades of carbon black are not preferred as fillers for processing of dynamic vulcanizates in an internal mixer. Note, though, that physical properties of the N-326-containing dynamic vulcanization were excellent, in spite of the difficult processing during dynamic vulcanization.

Example DV5 was designed to optimize the filler system, and the partition of ingredients used in dynamic vulcaniza-tion. As with DV1–DV3, this dynamic vulcanization could be performed with the ram up. This compound was adjusted to give a 75–80 Shore A durometer compound. The TAIC DLC (dry-liquid concentrate) was added in the first stage of mixing to assure that any water adsorbed onto the silica carrier of the TAIC DLC would be driven off during the high-temperature dynamic vulcanization step. The TAIC DLC level was also increased compared to DV1–DV4 because separate experiments (not shown) indicated that a higher concentration of TAIC was required to achieve optimum FKM properties in this system (based on Dai-E1 G-902 as opposed to the Dai-E1 LT-302 used in DV1–DV4). This particular dynamic vulcanizate was very smooth, and had a good balance of properties.

Dynamic vulcanizates DV1 through DV5 were subsequently converted to final-stage compounds by adding peroxide and (for DV1–DV4) TAIC DLC on the mill after the dynamic vulcanizate has cooled. (The final stage recipes are also indicated in Table 1.) The corresponding final stage compounds are known as FKM-1 through FKM-5; properties for these compounds are shown in Table 1. FKM-6 is a control compound, which has been conventionally mixed for comparison to FKM-5 (which is dynamically vulcanized). In FKM-6, both the Diak #1 and the peroxide cure system are added simultaneously, at relatively low temperature (below 110° C.). Furthermore, the two cure systems act simultaneously during press curing of the compound. FKM-6 represents a conventionally cured version of FKM-5.

DV7 and DV8 look at a special grade of Daikin peroxide-curable FKM, Dai-E1 G-912. This particular polymer is a 3-armed star polymer, similar to Dai-E1 G902 except having 3 terminal iodine groups. The high Mooney viscosity and also the ML of the final compounds (FKM-7 and FKM-8) indicates that there was a substantial interaction of the Diak #1 curative with the Dai-E1 G-912 fluoroelastomer. This is consistent with a relatively low, but still significant reactivity of the Dai-E1 G-912 with Diak #1. Although the Mooney viscosity and ML were high, these compounds nevertheless could be processed on a rubber mill, and produced useful physical properties when compression molded.

DV9 is an example of dynamic vulcanization of a high-fluorine FKM copolymer via a bisphenol cure system in the presence of a peroxide-curable FKM. In this case, Dai-E1 G-621 is a cure-incorporated polymer that includes both a bisphenol curative and a quaternary phosphonium accelerator/crosslinking catalyst. Dai-E1 G-621 is typical of numerous other bisphenol cure system FKMs which are sold in commerce as cure-incorporated polymers by DuPont, Dyneon, and Ausimont as well as Daikin. The compounder need only incorporate an effective amount of a metal oxide or hydroxide activator (typically $Ca(OH)_2$, MgO, or PbO) to make these cure-incorporated FKM polymers crosslink. This particular experiment was done to demonstrate that the bisphenol cure system can also be used in the dynamic vulcanization of an FKM copolymer in the presence of peroxide-crosslinkable FKMs. Note that, compared with the Diak-cured first stage DV compounds (e.g., FKM-2 to FKM-5), FKM-9 had significantly better scorch delay. The reason for this surprising fact is not known, but it has been seen in numerous other examples of FKM/FKM dynamic vulcanizates in which the first stage cure is via a bisphenol cure system, followed by a TAIC/peroxide second stage cure.

DV10 is an example of dynamic vulcanization of an FKM dipolymer in a blend of two different peroxide-curable FKMs of U.S. Pat. No. 4,158,678. As with DV7 & DV8, the Mooney viscosity and ML is high, indicating a rather high degree of reaction between the Diak #1 and the peroxide-curable FKMs. Although the Mooney viscosity and ML were high, FKM-10 nevertheless could be processed on a rubber mill, and produced useful physical properties when compression molded.

FKM-11 and FKM-12 are control compounds, which are closely related to FKM-5 and FKM-6. All these compounds have the same volume fractions of particulate fillers and activators. FKM-5 is a dynamic vulcanizate and an example of the process and compositions of the present invention. FKM-6 is a control compound with identically the same formulation, but prepared as a standard statically co-cured compound, rather than as a dynamic vulcanizate in which the two different cure systems act sequentially.

FKM-11 uses the same volume fractions of fillers and activators as FKM-5, but with only one of the two FKM polymers used in FKM-5 and FKM-6 (fluoroelastomer phase 1). The polymer in FKM-11 is crosslinkable by Diak #1 but not via peroxides; therefore FKM-11 is formulated without either peroxide or TAIC. The Diak #1 to FKM dipolymer ratio is the same in FKM-11 as in FKM-5 and FKM-6.

FKM-12 uses the same volume fractions of fillers and activators as FKM-5, but with only one of the two FKM polymers used in FKM-5 and FKM-6 (fluoroelastomer phase 2). The polymer in FKM-12 is not readily crosslinkable by Diak #1, but it is crosslinkable via peroxides. Therefore FKM-12 is formulated without Diak #1, and with peroxide and TAIC levels that are identical to FKM-5 and FKM-6.

Table 2 gives a few examples of peroxide-cured fluoroelastomers that constitute "fluoroelastomer phase 1" per this invention; these are dynamically cured in a matrix of a bisphenol-cured second stage ("fluoroelastomer phase 2.") From a strictly cost point of view, this blend morphology, with the major phase being a peroxide-cured fluoroelastomer, is more expensive and therefore less desirable than the opposite approach, in which diamine or bisphenol dynamic curing of FKM dipolymers or copolymers in a peroxide-curable FKM matrix is followed by peroxide cure of the matrix FKM (as in Table 1). There are however certain particular cases where dynamic vulcanization via a peroxide cure followed by a second stage cure by diamine or bisphenol may be desirable. One reason this could be desirable is the superior control of scorch delay that is possible with a bisphenol cure. Another reason is that bisphenol-cured FKM can exhibit superior adhesion to metal. Finally, in certain instances, such as FEPM compounds, there is a significant processability problem that can be addressed by dynamically curing the FEPM in a bisphenol-cured FKM matrix.

Example DV13 of Table 2 is an example of a peroxide-cured fluoroelastomer phase 1 which is cured in a bisphenol-cured matrix (fluoroelastomer phase 2). The Brabender torque/time curve showed that this compound did vulcanize in the mixer. The subsequent millability indicates that this was a partial vulcanization, as is desired in dynamic vulcanization. Although the resultant compound, FKM-13 had very high viscosity, it still resulted in a vulcanizate with good strength. Example DV14 of Table 2 is an example of peroxide-curing of FEPM as fluoroelastomer phase 1 in a matrix of a bisphenol-cured FKM matrix (fluoroelastomer phase 2). The Brabender torque/time curve showed that this compound did vulcanize in the mixer. The subsequent millability indicates that this was a partial vulcanization, as is desired in dynamic vulcanization. Although the resultant compound, FKM-14 had very high viscosity, it still resulted in a vulcanizate with good strength. Example DV15 of Table 2 is an example of a bisphenol-cured FKM as fluoroelastomer phase 1 in a matrix of FVMQ (fluoroelastomer phase 2). The Brabender torque/time curve showed that this compound did vulcanize in the mixer. The subsequent millability indicates that this was a partial vulcanization, as is desired in dynamic vulcanization. The resultant compound, FKM-15 has a peroxide cure system for the FVMQ. FKM-15 exhibited excellent milling behavior and low viscosity, and did form a final-stage vulcanizate, though it was weak.

Example DV16 of Table 2 was an attempt to reverse the phases of DV15, by peroxide-curing the FVMQ as fluoroelastomer phase 1 in a matrix of cure-incorporated FKM (fluoroelastomer phase 2). The Brabender torque/time curve showed that this compound did vulcanize in the mixer. The subsequent millability indicates that this was a partial vulcanization, as is desired in dynamic vulcanization. However, the second stage vulcanization, after addition of the activators for bisphenol cure, failed completely. It is believed that in this case the peroxide cure system destroyed or inactivated one or more of the curatives that is present in the FKM (bisphenol and onium salt activator).

Examples DV17 and DV18 of Table 2 are particularly favored examples of bisphenol-cured FKMs as fluoroelastomer phase 1 in a matrix of a particularly desirable peroxide-curable FKM with iodine cure sites. Both these dynamic vulcanizates achieve good physical properties after they are converted to final stage compounds FKM-17 and FKM-18, by addition of peroxide on the mill, after cooling. The sole difference between DV17 and DV18 is that a potent quaternary ammonium accelerator (Sachem 425) has been added to DV18 during the dynamic curing. The addition of this accelerator has two practical effects. First, the strength and stiffness is significantly increased via addition of the Sachem 425. Secondly, the minimum torque in the oscillating disc rheometer increases greatly when the Sachem 425 is added; this may indicate that the Sachem 425 causes an increased amount of crosslinking of fluoroelastomer phase 2 to occur.

Example DV19 of Table 2 is a particularly practical and low cost example of the present invention. In this case the bisphenol used to cure fluoroelastomer phase 1 is bisphenolsulfone, which is significantly less expensive that hexafluorobisphenol A, the most commonly used bisphenol in crosslinking of fluoroelastomers. Bisphenolsulfone produces equivalent oxidative stability and aging resistance to hexafluorobisphenol A, but is not normally used in curing of fluoroelastomers because of its high melting point (250° C.). It has been found that bisphenolsulfone can be successfully used in dynamic vulcanization of the present invention provided that the temperature during dynamic curing exceeds the melting point of bisphenolsulfone.

The cost figures cited throughout Tables 1 & 2 are based on list prices of the fluoroelastomers as of September 2000, and are approximate.

Table 3 details the ingredients used in the examples.

TABLE 1

Data Summary for Patent Examples

| Patent example designation:<br>Lab book page reference:<br>INGREDIENT: | DV1<br>RF3-40-17<br>detail. 1 | DV2<br>RF3-40-25<br>detail. 2 | DV3<br>RF3-40-24<br>detail. 3 | DV4<br>RF3-40-26<br>detail. 4 | DV5<br>RF3-44-4<br>detail. 5 | FKM-6<br>RF3-44-21<br>detail. 6 | DV7<br>RF3-41-7<br>detail. 7 | DV8<br>RF3-41-9<br>detail. 8 | DV9<br>RF3-40-36<br>detail. 9 | DV10<br>RF3-40-2<br>detail. 10 | MB-11<br>RF3-44-22<br>detail. 11 | MB-12<br>RF3-44-23<br>detail. 12 |
|---|---|---|---|---|---|---|---|---|---|---|---|---|
| Gum dipolymer FKM (FKM #1) | 70.00 | 70.00 | 70.00 | 70.00 | 70.00 | 70.00 | 70.00 | 70.00 | — | 70.00 | 100.00 | — |
| Dai-El G-621 (cure-incorporated FKM copolyr | — | — | — | — | — | — | — | — | 70.00 | — | — | — |
| Dai-El LT-302 (peroxide-curable, FKM #2) | 30.00 | 30.00 | 30.00 | — | — | — | — | — | 30.00 | — | — | — |
| Dai-El G902 (peroxide-curable, FKM #2) | — | — | — | — | 30.00 | 30.00 | 30.00 | — | — | 9.00 | — | 100.00 |
| Dai-El G912 (peroxide-curable, FKM #2) | — | — | — | — | — | — | — | 30.00 | — | — | — | — |
| Dai-El G801 (peroxide-curable, FKM #2) | — | — | — | 30.00 | — | — | — | — | — | 21.00 | — | — |
| N-990 | — | 5.00 | 5.00 | — | 10.00 | 10.00 | — | — | — | 10.00 | 10.11 | 9.73 |
| N-550 | — | — | — | — | 5.00 | 5.00 | — | — | 5.00 | 5.00 | 5.06 | 4.87 |
| N-326 | — | — | — | 5.00 | — | — | — | — | — | — | — | — |
| Polar Minerals 9603S (talc, aminosilanized) | 20.00 | 20.00 | 20.00 | 20.00 | 15.00 | 15.00 | 20.00 | 20.00 | 20.00 | 15.00 | 15.17 | 14.60 |
| Zinc oxide Kadox 911 | — | — | — | — | 6.00 | 6.00 | — | — | — | 5.00 | 6.07 | 5.84 |
| TAIC-DLC-A (72%) | — | — | — | — | 3.00 | 3.00 | — | — | 2.00 | — | — | 3.00 |
| Diak #1 (add below 120 C, then increase spe | 1.00 | 1.00 | 1.00 | 1.00 | 1.00 | 1.00 | 1.00 | 1.50 | — | 1.00 | 1.43 | — |
| Struktol WB 222 | — | — | — | — | — | — | — | — | — | 0.75 | — | — |
| Rhenofit CF | — | — | — | — | — | — | — | — | 6.00 | — | — | — |
| StarMag CX-50 (Magnesium oxide) | — | — | — | — | 15.00 | 15.00 | — | — | — | — | 15.17 | 14.60 |
| StarMag CX-150 (MgO) | 3.00 | 3.00 | 3.00 | 3.00 | — | — | 3.00 | 3.00 | 3.00 | 3.00 | — | — |
| Britmag Lycal 93/12 "dead-burn" MgO | 10.35 | 10.35 | 10.35 | 10.35 | — | — | 10.35 | 10.35 | — | 11.25 | — | — |
| Varox DBPH-50-HP | — | — | — | — | — | 0.90 | — | — | — | — | — | 0.90 |
| Total: | 134.35 | 139.35 | 139.35 | 139.35 | 155.00 | 155.90 | 134.35 | 134.65 | 136.00 | 151.00 | 153.01 | 153.55 |
| Calculated Specific Gravity: | 1.990 | 1.984 | 1.852 | 1.984 | 2.001 | 1.997 | 2.012 | 2.007 | 4.245 | 1.995 | 2.015 | 2.044 |
| Raw Material Cost/lb.: | $23.41 | $22.59 | $22.63 | $22.59 | $10.52 | $10.51 | $11.57 | $11.66 | $17.01 | $10.39 | $8.31 | $15.02 |
| Mooney Viscosity, LR (10 min/121 C) | 121.00 | — | — | — | 133.60 | 60.00 | 200+ | 200+ | — | — | — | — |

Final Stage Compounds

| Based on above masterbatch:<br>Final batch designation for patent disclosure:<br>Lab book page reference: | DV1<br>FKM-1<br>RF3-40-23 | DV2<br>FKM-2<br>RF3-40-28 | DV3<br>FKM-3<br>RF3-40-27 | DV4<br>FKM-4<br>RF3-40-29 | DV5<br>FKM-5<br>RF3-44-8 | FKM-6<br>FKM-6<br>RF3-44-21 | DV7<br>FKM-7<br>RF3-41-10 | DV8<br>FKM-8<br>RF3-41-12 | DV9<br>FKM-9<br>RF3-40-37 | DV10<br>FKM-10<br>RF3-42-5 | FKM-11<br>FKM-11<br>RF3-44-22 | FKM-12<br>FKM-12<br>RF3-44-23 |
|---|---|---|---|---|---|---|---|---|---|---|---|---|
| Curatives added on mill: | | | | | | | | | | | | |
| TAIC-DLC-A (72%) | 1.75 | 1.75 | 1.75 | 1.75 | — | not applic. | 1.75 | 1.75 | — | 2.00 | — | — |
| TAIC liquid (Diak #7) | — | — | — | — | — | incorp. | — | — | — | — | — | — |
| Varox DBPH-50-HP | 1.00 | 1.00 | 1.00 | 1.00 | 0.90 | above | 1.25 | 1.25 | 0.90 | 1.00 | — | — |
| Diak #1 | — | — | — | — | — | | — | — | — | — | — | — |

TABLE 1-continued

Data Summary for Patent Examples

| Test Results: Curing & Flow Properties | FKM-1 | FKM-2 | FKM-3 | FKM-4 | FKM-5 | FKM-6 | FKM-7 | FKM-8 | FKM-9 | FKM-10 | FKM-11 | FKM-12 |
|---|---|---|---|---|---|---|---|---|---|---|---|---|
| Mooney Viscometer time (min)/Temp (C) | 10/121 | 10/121 | 10/121 | 10/121 | 10/121 | 10/121 | 10/121 | 10/121 | 10/121 | 10/121 | 10/121 | 10/121 |
| Mooney rotor (large = LR, small = SR) | LR | LR | LR | LR | LR | LR | LR | LR | LR | LR | LR | LR |
| Minimum Mooney viscosity (*note 1) | — | — | — | — | 133.60 | 72.10 | 200+ | 200+ | 110.30 | 151.10 | 105.20 | 43.10 |
| time at minimum (minutes) | — | — | — | — | 4.90 | — | — | — | — | 3.82 | — | — |
| time to 5 point Mooney rise (scorch indicator) | — | — | — | — | 7.55 | — | — | — | — | 5.47 | — | — |
| Monsanto ODR time (min)/Temp (C) | 12/177 | 12/177 | 12/177 | 12/177 | 12/177 | 12/177 | 12/177 | 12/177 | 12/177 | 12/177 | 12/177 | 12/177 |
| ML | 29.6 | 32.3 | 25.4 | 28.5 | 31.9 | 11.7 | 51.1 | 62.8 | 25.7 | 38.1 | 13.6 | 4.0 |
| MH | 64.2 | 65.9 | 55.9 | 62.4 | 79.0 | 47.5 | 96.6 | 120.0 | 61.1 | 72.0 | 61.4 | 147.6 |
| ts2 | 1.2 | 1.1 | 1.4 | 1.2 | 1.0 | 1.1 | 0.8 | 0.6 | 1.8 | 1.3 | 1.9 | 1.2 |
| t'50 | 1.7 | 1.7 | 2.0 | 1.7 | 1.9 | 2.3 | 1.5 | 1.6 | 2.6 | 2.2 | 4.7 | 2.3 |
| t'90 | 2.6 | 2.3 | 2.7 | 2.6 | 3.7 | 6.2 | 2.4 | 3.5 | 4.1 | 5.7 | 9.0 | 3.5 |
| MH-ML | 34.6 | 33.6 | 30.5 | 33.9 | 47.1 | 35.8 | 45.5 | 57.2 | 35.4 | 33.9 | 47.8 | 143.6 |
| Mechanical Properties | | | | | | | | | | | | |
| presstime minutes/temp Celsius | 20/160 | 10/177 | 10/177 | 10/177 | 10/160 | 10/177 | 20/160 | 20/160 | 10/160 | 15/160 | 10/160 | 10/160 |
| postcure hours/temp Celsius | | | | | | 16/232 | | | | | 16/232 | 16/232 |
| Shore A durometer | 66 | 66 | 66 | 67 | 76 | 79 | 74 | 76 | 72 | 74 | 76 | 82 |
| Tensile Strength (psi) | 1775 | 1,432 | 1,590 | 1,535 | 1,523 | 1,342 | 1,406 | 1,604 | 1,449 | 1,924 | 1,931 | 2,604 |
| tensile Elongation (%) | 345 | 389 | 451 | 392 | 292 | 293 | 173 | 124 | 316 | 273 | 223 | 188 |
| 100% modulus (psi) | 813 | 595 | 682 | 663 | 1,078 | 969 | 1,104 | 1,400 | 875 | 857 | 1,075 | 1,722 |
| Experimental specific gravity (g/cc) | 1.97 | 1.97 | 1.96 | 1.96 | 2.00 | 2.02 | 1.98 | 1.98 | 1.97 | 2.01 | 2.06 | |
| Compression set (22 hours @ 200 C) | — | — | — | — | — | 44.4% | — | — | — | — | 42.01% | 15.55% |

Notes
*1: Mooney viscosity was measured at 121 degrees C with large rotor. If time at minimum is not shown, then minimum Mooney refers to value at 10 minutes.
*2: All formulations in this table are based on 100 total parts of elastomer. The term "phr" used herein means parts per hundred elastomer.

TABLE 2

| Data Summary for Patent Examples | | | | | | | |
|---|---|---|---|---|---|---|---|
| Patent example designation: | DV13 | DV14 | DV15 | DV16 | DV17 | DV18 | DV19 |
| Lab book page reference: | RF3-40-38 | RF3-40-40 | RF3-40-42 | RF3-40-44 | RF3-44-86 | RF3-44-87 | RF3-44-101 |
| INGREDIENT: | | | | | | | |
| Dai-El G-701-BP | — | — | — | — | 62.50 | 62.50 | 62.50 |
| Dai-El G-902 | — | — | — | — | 30.00 | 30.00 | 30.00 |
| Dai-El G-621 | 35.00 | — | — | — | | | |
| Fluorel BRE-7231X | — | 35.00 | — | — | | | |
| Fluorel FC 2120 | — | — | 60.00 | 40.00 | | | |
| EX-1245 FVMQ base compound, 70 duro | — | — | 61.32 | 91.98 | | | |
| Dai-El G912 (peroxide-curable, 56 Mooney) | 65.00 | — | — | — | | | |
| Aflas 100S | — | 65.00 | — | — | | | |
| Cri-Mag-HX-45 | — | — | — | — | 15.00 | 15.00 | 15.00 |
| N-550 | — | — | — | — | | | |
| N-990 | 25.00 | 30.00 | — | — | 9.00 | 9.00 | |
| Polar Minerals 9603S (talc, aminosilanized) | — | — | — | — | | | |
| Viton Cure 50 | — | — | — | — | 1.35 | 1.35 | |
| Diphone D | — | — | — | — | | | 0.78 |
| Sachem 425 | — | — | — | — | | 0.20 | 0.72 |
| TAIC-DLC-A (72%) | 3.00 | 5.00 | — | — | 3.00 | 3.00 | 3.00 |
| Varox DBPH-50-HP | 2.00 | 3.00 | — | 1.50 | | | |
| Zinc oxide Kadox 911 | — | — | — | — | 5.00 | 5.00 | 5.00 |
| Fluorocal H-20 | — | — | — | | | | |
| Rhenofit CF | — | — | 6.00 | | | | |
| StarMag CX-150 (MgO) | — | — | 3.00 | | | | |
| Total: | 130.00 | 138.00 | 130.32 | 133.48 | 125.85 | 126.05 | 117.00 |

Final Stage Compounds

| | | | | | | | |
|---|---|---|---|---|---|---|---|
| Based on above masterbatch: | DV13 | DV14 | DV15 | DV16 | DV17 | DV18 | DV19 |
| Final batch designation for patent disclosure: | FKM-13 | FKM-14 | FKM-15 | FKM-16 | FKM-17 | FKM-18 | FKM-19 |
| Lab book page reference: | RF3-40-39 | RF3-40-41 | RF3-40-43 | RF3-40-45 | RF3-44-89 | RF3-44-90 | RF3-44-102 |
| Curatives added on mill: | | | | | | | |
| Rhenofit CF | 6.00 | 6.00 | | 6.00 | | | |
| StarMag CX-150 (MgO) | 3.00 | 3.00 | | 3.00 | | | |
| Varox DCP-40KE HP | | | | | 0.90 | 0.90 | 0.90 |
| Varox DBPH-50-HP | | | 1.50 | | | | |
| Calculated Specific Gravity: | 1.879 | 1.635 | 1.679 | 1.710 | 1.874 | 1.872 | 1.934 |
| Raw Material Cost/lb.: | $15.42 | $17.94 | $17.85 | $16.92 | $12.65 | $12.65 | $11.11 |
| Raw Material Cost/liter: | $63.80 | $64.60 | $66.02 | $63.71 | 52.00 | 51.93 | 47.11 |

Test Results.

| | | | | | | | |
|---|---|---|---|---|---|---|---|
| Curing & Flow Properties | FKM-13 | FKM-14 | FKM-15 | FKM-16 | FKM-17 | FKM-18 | FKM-19 |
| Mooney Viscometer time (min)/Temp (C) | 10/121 | 10/121 | 10/121 | 10/121 | 10/121 | 10/121 | 10/121 |
| Minimum Mooney viscosity (* note 1) | — | — | 9.2 | 11.80 | — | — | — |
| time at minimum (minutes) | — | — | — | — | — | — | — |
| time to 5 point Mooney rise (scorch indicator) | — | — | — | — | — | — | — |
| Monsanto ODR time(min)/Temp (C) | 12/177 | 12/177 | 12/177 | 12/177 | 12/177 | 12/177 | 12/177 |
| ML | 62.9 | 55.7 | 8.2 | 6.4 | 8.4 | 30.5 | 22.3 |
| MH | 75.3 | 59.7 | 33.7 | 6.4 | 26.9 | 86.4 | 76.2 |
| ts2 | 1.3 | 6.2 | 1.1 | — | 2.8 | 2.0 | 2.1 |
| t'50 | 3.7 | 6.8 | 1.9 | — | 4.5 | 3.6 | 3.5 |
| t'90 | 9.5 | 9.9 | 3.7 | — | 9.1 | 5.6 | 5.9 |
| MH-ML | 12.4 | 4.0 | 25.5 | — | 18.5 | 55.9 | 53.9 |
| | | | | no cure | | | |
| Mechanical Properties | | | | | | | |
| presstime minutes/temp Celsius | 10/177 | 10/177 | 10/177 | 10/177 | 10/177 | 10/177 | 10/177 |
| postcure hours/temp Celsius | 16/232 | 16/232 | 16/232 | 16/232 | 16/232 | 16/232 | 16/232 |
| Shore A durometer | 75 | 73 | 50 | n/a | 62 | 65 | 75 |
| Tensile Strength (psi) | 2064 | 1,601 | 230 | n/a | 1,863 | 2,606 | 2,162 |
| tensile Elongation (%) | 170 | 198 | 159 | n/a | 253 | 234 | 234 |
| 100% modulus (psi) | 1247 | 988 | 185 | n/a | 409 | 573 | 1,210 |
| Experimental specific gravity (g/cc) | 1.92 | 1.67 | 1.69 | n/a | 1.91 | 1.91 | 1.97 |
| Die C tear strength, pli | | | | | 113.40 | 111.50 | 159.9 |
| Compression set (22 hours @ 200 C) | | | | | 11.91 | 10.69 | 23.8 |

Notes
*1: Mooney viscosity was measured at 121 degrees C with large rotor. If time at minimum is not shown, then minimum Mooney refers to value at 10 minutes.
*2: All formulations in this table are based on 100 total parts of elastomer. The term "phr" used herein means parts per hundred elastomer.

TABLE 3

Ingredients used in Examples

| Ingredient name | Supplier | Chemical Composition |
| --- | --- | --- |
| (POLYMERS) | | |
| Dai-EI G701BP | Daikin America, Inc. | gum dipolymer FKM, 66% fluorine, 50 Mooney (large rotor, 10' @ 121° C.) |
| Dai-EI G755 | Daikin America, Inc. | gum dipolymer FKM, 66% fluorine, 25 Mooney (large rotor, 10' @ 121° C.) |
| Dai-EI G-621 | Daikin America, Inc. | Cure-incorporated terpolymer FKM, 71.7% fluorine, 50 Mooney (large rotor, 10' @ 121° C.) |
| Dai-EI LT-302 | Daikin America, Inc. | peroxide-curable FKM, 65% fluorine, low temperature copolymer; 30 Mooney (large rotor, 10' @ 121° C.) |
| Dai-EI G801 | Daikin America, Inc. | peroxide-curable FKM, 71% fluorine, 19 Mooney (large rotor, 10' @ 121° C.) |
| Dai-EI G902 | Daikin America, Inc. | peroxide-curable FKM, 71% fluorine, 19 Mooney (large rotor, 10' @ 121° C.) |
| Dai-EI G912 | Daikin America, Inc. | peroxide-curable FKM, 71% fluorine, 56 Mooney (large rotor, 10' @ 121° C.); 3-armed branched structure |
| Fluorel FC 2120 | Dyneon, Inc. | Cure-incorporated dipolymer FKM, 66% fluorine, 20 Mooney (large rotor, 10' @ 121° C.) |
| Fluorel BRE-7231X | Dyneon, Inc. | Proprietary base-resistant FKM/FEPM hybrid |
| Aflas 100S | Dyneon, Inc. | FEPM polymer (copolymer of propylene + tetrafluoroethylene), heat treated to introduce unsaturation. |
| EX-1245 | Cri-Sil, Inc. | FVMQ base compound, 70 durometer; 153.3 total parts per 100 parts elastomer |
| Cri-Mag-HX-45 | Cri-Tech, Inc. | Masterbatch of 45% high surface-area MgO in 50% 25-Mooney FKM gum polymer with 5% added proprietary process aides |
| (NON-POLYMERS) | | |
| Diak #1 | E.I. DuPont de Nemours & Co. | hexamethylene diamine carbamate |
| Cure 50 | E.I. DuPont de Nemours & Co. | hexafluorobisphenol A, partial benzyltriphenylphosphonium salt |
| Diphone D | Clariant Corp. | 4,4'-dihydroxydiphenylsulfone |
| Sachem 425 | Sachem, Inc. | Tetrabutylammonium bisulfate |
| TAIC-DLC-A (72%) | Natrochem, Inc. | 72% triallylisocyanurate on silica carrier |
| Varox DCP-40KE HP | R.T. Vanderbilt | dicumylperoxide, 40% active on inert carrier, with added proprietary scorch inhibitor |
| Varox DBPH-50-HP | R.T. Vanderbilt | 2,5-di(t-butylperoxy)hexane, 50% active on inert carrier, with added proprietary scorch inhibitor |
| Rhenofit CF | Rhein Chemie | 20-micron $Ca(OH)_2$ with added dispersion aid |
| Fluorocal H-20 | Merrand International Corp. | 20-micron $Ca(OH)_2$ |
| N-990 | Cabot Corporation | Carbon black (low structure, low surface area thermal carbon black) |
| N-550 | Cabot Corporation | Carbon black (high structure, low surface area furnace black) |
| N-326 | Cabot Corporation | Carbon black (low structure, high surface area furnace black) |
| StarMag CX-150 | Merrand International Corp. | Surface-treated $MgO/Mg(OH)_2$, loss on ignition ~12%, BET surface area ~150 $m^2$/gram |
| StarMag CX-50 | Merrand International Corp. | $MgO/Mg(OH)_2$, loss on ignition ~8%, BET surface area ~50 $m^2$/gram |
| Britmag Lycal 93/12 | Distributor: Merrand International Corp. | "Dead burn" MgO, loss on ignition ~2%, BET surface area ~12 $m^2$/gram |
| Kadox 911 | Zinc Corporation of America | French process zinc oxide, surface area 9.5 $m^2$/gram, average particle size .12 micron |
| 9603S talc | Polar Minerals | Aminosilanized talc |
| Struktol WB-222 | Struktol, Inc. | Processing aid (proprietary) |

The invention encompasses the scope of the following claims.

What is claimed is:

1. A millable, vulcanizable elastomeric composition comprising:

at least two non-miscible fluoroelastomer constituents, wherein a first fluoroelastomer constituent is present as crosslinked fluoroelastomer particles, and wherein a second fluoroelastomer constituent remains flowable until a final stage vulcanization occurs, and wherein the first fluoroelastomer constituent is present at between 5–85% by weight of the final composition;

wherein one of the first and second fluoroelastomer constituents consists of one or more of FKM dipolymers and copolymers which are crosslinked by diamines, polyamines, bisphenol, and/or polyphenol-based cure systems; and wherein the other of the first and second fluoroelastomer constituents consists of one or more peroxide-curable FKMs.

2. A millable, vulcanizable elastomeric composition of claim 1 in which the other of the first and second fluoroelastomer constituents consists of one or more iodine cure site peroxide-curable FKMs.

3. A millable, vulcanizable elastomeric composition of claim 1 in which the other of the first and second fluoroelastomer constituents consists of one or more peroxide-curable fluorosilicones.

4. A millable, vulcanizable elastomeric composition of claim 1 in which the other of the first and second fluoroelastomer constituents consists of one or more catalyzed hydride-curable fluorosilicones.

5. A millable, vulcanizable elastomeric composition of claim 1 in which the one of the first and second fluoroelastomer constituents consists of one or more peroxide-cured fluorosilicone polymers.

6. A millable, vulcanizable elastomeric composition of claim 5 in which the other of the first and second fluoroelastomer constituents consists of one or more of diamine-curable and bisphenol-curable FKMs.

7. A millable, vulcanizable elastomeric composition of claim 5 in which the other of the first and second fluoroelastomer constituents consists of one or more perfluoroelastomers.

8. A millable, vulcanizable elastomeric composition of claim 1 in which the one of the first and second fluoroelastomer constituents consists of one or more peroxide-cured FKM polymers.

9. A millable, vulcanizable elastomeric composition of claim 8 in which the other of the first and second fluoroelastomer constituents consists of one or more bisphenol-curable FKM.

10. A millable, vulcanizable elastomeric composition of claim 8 in which the other of the first and second fluoroelastomer constituents consists of one or more perfluoroelastomers.

11. A millable, vulcanizable elastomeric composition of claim 1 in which the one of the first and second fluoroelastomer constituents consists of one or more catalyzed hydride-cured fluorosilicones.

12. A millable, vulcanizable elastomeric composition of claim 11 in which the other of the first and second fluoroelastomer constituents consists of one or more of diamine-curable and bisphenol-curable FKM.

13. A millable, vulcanizable elastomeric composition of claim 11 in which the other of the first and second fluoroelastomer constituents consists of one or more perfluoroelastomers.

14. A millable, vulcanizable elastomeric composition of claim 11 in which the other of the first and second fluoroelastomer constituents consists of one or more peroxide-curable FKM.

15. A millable, vulcanizable elastomeric composition of claim 14 in which the other of the first and second fluoroelastomer constituents consists of one or more peroxide-curable FKMs with iodine-functional cure sites.

16. A millable, vulcanizable elastomeric composition of claim 1 in which the one of the first and second fluoroelastomer constituents consists of one or more FEPM elastomers.

17. A millable, vulcanizable elastomeric composition of claim 16 in which the other of the first and second fluoroelastomer constituents consists of one or more bisphenol-curable FKM copolymers.

18. A millable, vulcanizable elastomeric composition of claim 1 in which the other of the first and second fluoroelastomer constituents is crosslinked in a final stage vulcanization.

* * * * *